Dec. 24, 1940.  C. B. SPANGENBERG  2,226,297
REFRIGERATION CONTROL SYSTEM
Filed Aug. 4, 1939

Inventor
Charles B. Spangenberg
by George H. Fisher
Attorney

Patented Dec. 24, 1940

2,226,297

UNITED STATES PATENT OFFICE 2,226,297

REFRIGERATION CONTROL SYSTEM

Charles B. Spangenberg, Minneapolis, Minn., assignor to Minneapolis-Honeywell Regulator Company, Minneapolis, Minn., a corporation of Delaware Application August 4, 1939, Serial No. 288,316

22 Claims. (Cl. 62—4)

This invention relates to improvements in refrigeration control systems and the main object of this invention is to provide an improved mechanical control arrangement for accomplishing in an improved manner substantially the same sequence of operation which is electrically obtained in a W. R. Miller application Serial No. 101,107 filed September 16, 1936, which has matured into Patent No. 2,191,967.

More specifically an object of this invention is to provide a mechanical control arrangement for a refrigerating apparatus having a control structure responsive to the condition being controlled by the evaporator of the refrigerating apparatus, a control structure responsive to a condition indicative of evaporator temperature, a control structure responsive to the pressure on the high pressure side of the refrigerating apparatus and a control device mechanically controlled by the control structures to start and stop the refrigerating apparatus under certain conditions.

Preferably the parts are so arranged that the refrigerating apparatus is started only when the condition controlled by the evaporator increases to a predetermined high value, the evaporator temperature increases to a predetermined high value and the pressure on the high pressure side decreases to a predetermined low value and is stopped when either the condition controlled by the evaporator decreases to a predetermined low value or the evaporator temperature decreases to a predetermined low value or the pressure on the high pressure side increases to a predetermined high value. However, provision is made for readily and easily altering a portion of the control arrangement to change the sequence of operation to one wherein the refrigerating apparatus is started only when the pressure on the high pressure side decreases to a predetermined low value and either the condition controlled by the evaporator or the evaporator temperature increases to predetermined high values and is stopped when either the pressure on the high pressure side increases to a predetermined high value or both the condition controlled by the evaporator and the evaporator temperature decrease to predetermined low values. The provision of this mechanism in the control arrangement which permits these different sequences of operation also forms an object of this invention.

A further object of this invention is to provide the control arrangement with independent adjusting means whereby the values of the various conditions which cause starting of the refrigerating apparatus may be independently adjusted with respect to the values of the various conditions which cause stopping of the refrigerating apparatus and vice versa.

Other objects of this invention reside in the details of construction and the cooperation of the parts of the control arrangement.

Further objects and advantages of this invention will become apparent to those skilled in the art upon reference to the accompanying specification, claims and drawing, in which:

Figures 1, 4, 5:
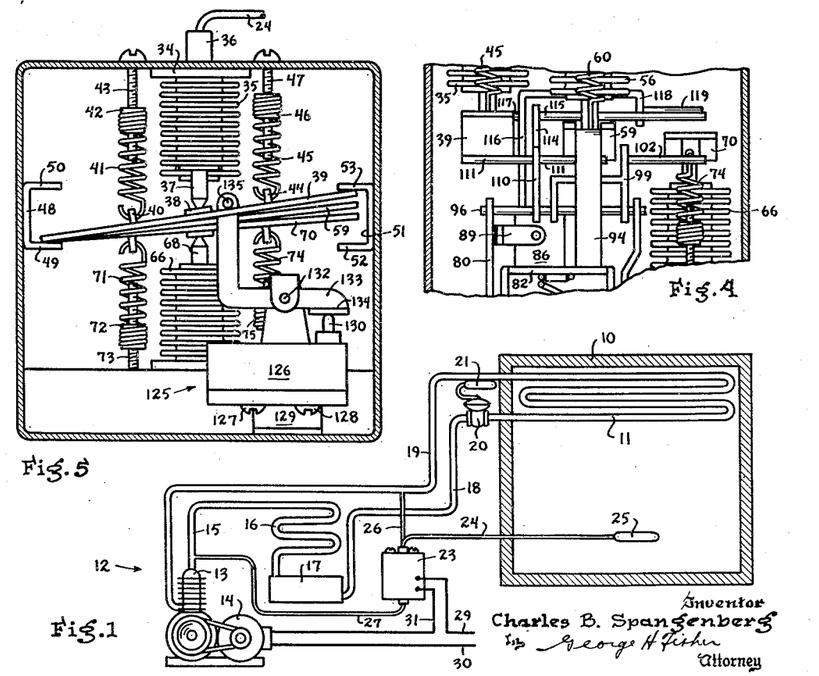
Figure 1 is a diagrammatic illustration of the control arrangement applied to a refrigerating apparatus for controlling the operation thereof.
Figure 4 is a partial view similar to Figure 3 showing the manner in which the sequence of operation of the control arrangement of Figures 2 and 3 may be changed.
Figure 5 is an elevational view of a modified arrangement for accomplishing substantially the same results as are accomplished by the control arrangements of Figures 2 and 3.

Referring now to Figure 1, a compartment to be cooled such as a storage compartment, room, counter-case, walk-in-box or the like is designated at 10. The compartment 10 may be cooled by a cooling coil which may take the form of an evaporator 11. Refrigerant is circulated through the evaporator 11 by means of a refrigerating apparatus generally designated at 12 which may comprise a compressor 13 operated by an electric motor 14. Compressed refrigerant is discharged from the compressor 13 through a high pressure line 15 to a condenser 16 and the condensed refrigerant is collected in a receiver 17. Liquid refrigerant flows from the receiver 17 through a liquid line 18 to the evaporator 11 and evaporated refrigerant is withdrawn from the evaporator 11 through a suction line 19 by the compressor 13. The flow of refrigerant to the evaporator 11 may be controlled by the usual thermostatic expansion valve 20 having a thermal bulb 21 responding to the temperature of the gaseous refrigerant leaving the evaporator 11. Since the construction thus far described is conventional in the art a further description thereof is not considered necessary, it being sufficient to state that when the compressor 13 is placed in operation refrigerant is circulated through the evaporator 11 to cool the compartment 10.

The operation of the compressor motor 14 and hence the compressor 13 is controlled by the control arrangement designated at 23. The control arrangement 23 contains a bellows connected by a capillary tube 24 to a bulb 25 located in the compartment 10. The bulb 25 contains a volatile fluid so that the control arrangement is operated in accordance with changes in temperature within the compartment 10. Another bellows contained within the control arrangement 23 is connected by a pipe 26 to the suction line 19 so that the control arrangement is operated in response to variations in suction pressure. Since evaporator temperature and suction pressure correspond with each other the control arrangement is accordingly operated in response to changes in a condition indicative of evaporator temperature. The control arrangement 23 also includes another bellows which is connected by a pipe 27 to the high pressure line 15 so that the control arrangement is additionally controlled in accordance with the pressure on the high pressure side of the refrigerating apparatus. A switch contained within the control arrangement 23 is controlled by the temperature of the compartment 10, the temperature of the evaporator 11 and the pressure on the high pressure side of the refrigerating apparatus for controlling the operation of the compressor motor 14. Power is supplied to the compressor motor 14 by means of line wires 29 and 30 leading from some source of power, not shown, and when the switch within the control arrangement 23 is closed a circuit is completed from the line wire 29 through the switch, wire 31 and the compressor motor 14 back to the other line wire 30 to operate the compressor motor 14 and hence the compressor 13 to cool the compartment 10.

Figure 2:
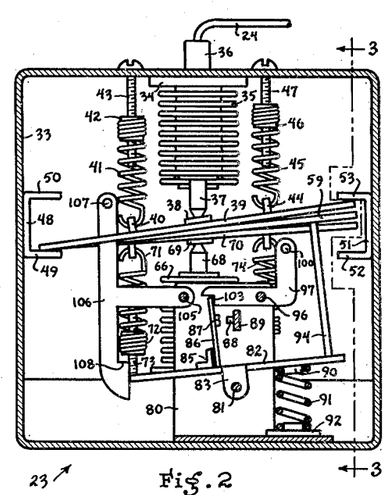
Figure 2 is a sectional view of one form of the control arrangement of this invention taken substantially along the line 2—2 of Figure 3.
Figure 3:
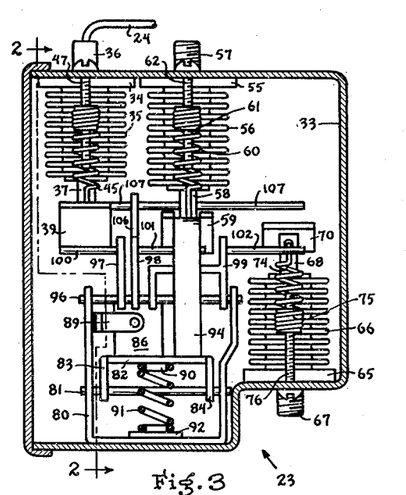
Figure 3 is a sectional view of the control arrangement taken substantially along the line 3—3 of Figure 2.

The details of construction of the control arrangement 23 are illustrated in Figures 2 and 3. A mounting structure 34 carrying a bellows 35 is connected to the upper wall of a casing 33. Extending through the upper wall of the casing 33 is a fitting 36 to which the capillary tube 24 leading from the bulb 25 is connected. The bellows 35 operates a plunger 37 which engages a cup 38 carried by a floating lever 39. The left end of the lever 31 is provided with an ear 40 to which is secured one end of an adjustable tension spring 41. The other end of the tension spring 41 is connected to a nut 42 screw-threadedly mounted on a screw 43 extending through the upper wall of the casing 33. In like manner the right end of the floating lever 39 is provided with an ear 44 to which is secured one end of an adjustable tension spring 45. The other end of the adjustable tension spring 45 is connected to a nut 46 screw-threadedly mounted on a screw 47 which also extends through the upper wall of the casing 33. A bracket 48 secured to an outer wall of the casing 33 is provided with limit stops 49 and 50 for limiting the movement of the left-hand end of the floating lever 39. A bracket 51 secured to another wall of the casing 33 is also provided with stops 52 and 53 for limiting the movement of the right-hand end of the floating lever 39. Since the bulb 25 connected to the bellows 35 is charged with a volatile fluid the bellows 35 is expanded and contracted in accordance with temperature changes in the compartment 10. For purposes of illustration it is assumed that the springs 41 and 45 are so adjusted that the spring 45 is more effective than the spring 41. Assume now that the temperature within the fixture is 40° and that the springs 41 and 45 are holding the floating lever 39 against the upper stops 50 and 53. Upon an increase in temperature from 40° to 40½° the bellows 35 expands and overcomes the spring 41 to move the left-hand end of the floating lever 39 against the lower stop 49. The lever then remains in this position until such time as the temperature within the compartment rises to 41½° and as the temperature continues to rise from 41½° to 42° the right-hand end of the floating lever 39 is moved from the upper stop 53 to the lower stop 52. Thus when the temperature within the compartment is 40° both ends of the floating lever 39 engage the upper stops 50 and 53 and when the temperature increases to 42° both ends of the floating lever 39 engage the lower stops 49 and 52. By adjusting the tension of the spring 41 the temperature value in the compartment 10 at which the left-hand of the floating lever 39 engages the upper stop 50 may be varied at will and likewise by adjusting the tension in the spring 45 the temperature value at which the right-hand end of the floating lever 39 engages the lower stop 52 may be adjusted at will. These adjustments are entirely independent of each other, that is, adjustment of one spring to regulate the operation of one end of the floating lever 39 has no effect whatsoever upon the operation of the other end of the floating lever 39 and vice versa.

Another mounting structure 55 (Figure 3) carrying a bellows 56 is also secured to the upper wall of the casing 33 and this mounting structure is provided with a fitting 57 to which may be secured the pipe 26 leading from the suction line 19. The bellows 56 operates a plunger 58 which in turn operates a second floating lever 59. The second floating lever 59 is also secured to two adjustable tension springs in the same manner as the first floating lever 39. However, only one of these springs 60 is shown in Figure 3. One end of the spring 60 is connected to the lever 59 and the other end is connected to a nut 61 screw-threadedly mounted on a screw 62 extending through the upper wall of the casing 33. For purposes of illustration it is assumed that the two springs associated with the lever 59 are so adjusted that the right-hand spring is more effective than the left-hand spring. Assume that the suction pressure on the low side of the refrigerating apparatus and hence the pressure in the evaporator 11 is 15 lbs. and that the lever 59 is engaging the upper stops 50 and 53. When the suction pressure increases from 15 lbs. to 16 lbs. the left end of the second floating lever 59 is moved into engagement with the lower stop 49 and the lever will remain in this position until such time as the suction pressure increases to 34 lbs. As the suction pressure increases from 34 lbs. to 35 lbs. the right end of the floating lever 59 is moved from the upper stop 53 to the lower stop 52. Hence when the suction pressure is at 15 lbs. both ends of the floating lever 59 are engaging the upper stops 50 and 53 and when the suction pressure increases to 35 lbs. both ends of the floating lever 59 engage the lower stops 49 and 52. By independently adjusting the two springs associated with the suction pressure bellows 56 the pressure value at which the floating lever 59 engages the upper stop 50 may be independently adjusted with respect to the pressure can be opened only when both latch members 116 and 114 are released and as pointed out above this can occur only when the suction pressure decreases to 15 lbs. and the temperature decreases to 40°. When both latch members 114 and 116 are thus released the switch is opened and the compressor is stopped. Since the floating lever 70 can engage both pins 115 and 119 when the pressure on the high pressure side increases to 190 lbs. both latch means 114 and 116 are therefore released to open the switch and stop operation of the compressor whereby safe operation of the refrigerating apparatus is assured.

The operation of the construction shown in Figure 5 may be summarized briefly as follows. The compressor is placed in operation when either the suction pressure increases to a predetermined high value, illustratively 35 lbs., or the temperature increases to a predetermined high value, illustratively 42°, providing the pressure on the high pressure side of the refrigerating apparatus decreases to a predetermined low value, illustratively 140 lbs. After the compressor has been placed in operation it may be stopped only when both the temperature decreases to a predetermined low value, illustratively 40°, and the suction pressure decreases to a predetermined low value, illustratively 15 lbs. If in the meantime the pressure on the high pressure side of the refrigerating apparatus increases to 190 lbs. the compressor will be stopped. As pointed out above, this change in sequence of operation may be accomplished merely by rearranging the various latch members.

Referring now to Figure 5, there is illustrated a different form of the invention which accomplishes substantially the same sequence of operation as is accomplished by the control arrangement of Figures 2 and 3. Here the same bellows, floating levers, springs and stops are utilized as are utilized in Figures 2 and 3 and therefore like reference characters are used for like parts. The construction of Figure 5 differs from that of Figures 2 and 3 in the use of a different type of switch and operating means therefor. In Figure 5 the switch is generally designated at 125 and may take the form of the switch shown and described in B. E. Shaw Patent No. 2,111,816 granted March 22, 1938. This switch may comprise a box 126 provided with electrical terminals 127 and 128 to which the wires 29 and 31 of Figure 1 may be secured. Located in the box 126 is a snap action switch which is normally biased by a spring means towards a closed position. Extending out of the upper portion of the box 126 is a plunger 130 which when moved downwardly overcomes the biasing means of the switch to move the switch to an open position. When the plunger 130 moves outwardly under the influence of the biasing means in the box 126 the switch contained therein is moved to a closed position with a snap action by the biasing means. A snap action switch of this type necessarily has a relatively wide differential of operation, that is, the plunger 130 must be moved downwardly to quite an extent to cause opening of the switch and before the switch is re-closed the plunger 130 must move outwardly quite an extent. A bracket 128 which carries the snap action switch 125 may extend upwardly and be provided with a pivot pin 132 upon which is pivoted a lever 133. One end of the lever 133 is provided with an ear 134 for engaging the plunger 130 of the snap action switch for operating the same. The other end of the lever 133 is provided with a pin 135 which may be engaged by all of the floating levers 39, 59 and 70.

Assume now that the temperature within the enclosure 10 is 40°, that the suction pressure is 15 lbs. and that the pressure on the high pressure side of the refrigerating apparatus is 190 lbs. Under these conditions all of the floating levers 39, 59 and 70 are engaging the upper stops 50 and 53 whereupon the lever 153 is moved in a clockwise direction to move the plunger 130 downwardly to open the snap action switch 125. When the temperature within the enclosure 10 increases to 42° and the suction pressure increases to 35 lbs. and the pressure on the high pressure side of the refrigerating apparatus decreases to 140 lbs., the floating levers 39, 59 and 70 are moved against the lower stops 49 and 52. The pin 135 carried by the lever 133 therefore moves downwardly and the plunger 130 moves upwardly to close the snap action switch 125. By reason of the arrangement of the parts shown in Figure 5 the plunger 130 can be moved upwardly to cause closing of the snap action switch 125 only when the temperature rises to a predetermined high value, the suction pressure rises to a predetermined high value, and the pressure on the high pressure side decreases to a predetermined low value. After the compressor is thus placed in operation it remains in operation until such time as any of the floating levers 39, 59 and 70 are moved against the upper stops 50 and 53 and as pointed out above, this can occur when either the temperature decreases to 40°, the suction pressure decreases to 15 lbs., or the pressure on the high pressure side increases to 190 lbs. Thus it is seen that the modification illustrated in Figure 5 operates in exactly the same manner as the modifications illustrated in Figures 2 and 3.

Although for purposes of illustration various temperature and pressure values are set forth, these values are not to be construed in a limiting sense but for purposes of illustration only. While for purposes of illustration several forms of this invention have been disclosed, other forms thereof may become apparent to those skilled in the art upon reference to this disclosure and therefore this invention is to be limited only by the scope of the appended claims.

I claim as my invention:

1. In a control system for a refrigerating apparatus having evaporator means for controlling the condition of a medium and a mechanism for controlling the circulation of refrigerant through the evaporator means, the combination of, a first floating lever adapted to be operated between first and second limit positions, means responsive to a pressure indicative of evaporator temperature for moving the first floating lever to the first position when the evaporator temperature increases to a predetermined high value and to the second position when the evaporator temperature decreases to a predetermined low value, means for independently adjusting the pressure values at which the means responsive to a pressure indicative of evaporator temperature will move the first floating lever to the first and second positions, a second floating lever adapted to be moved between first and second limit positions, means responsive to the pressure on the high pressure side of the refrigerating apparatus for moving the second floating lever to the first position when the pressure decreases to a predetermined low value and to the second position when the pressure increases to a predetermined high value, means for independently adjusting the high pressure values at which the means responsive to the pressure will move the second floating lever to the first and second positions, a control device for controlling the mechanism which controls the circulation of refrigerant through the evaporator means, and means controlled by both levers for positioning the control device to start circulation of refrigerant through the evaporator means only when both levers are moved to the first positions and to stop circulation of refrigerant through the evaporator means when either of the levers is moved to the second position.

2. In a control system for a refrigerating apparatus having evaporator means for controlling the condition of a medium and a mechanism for controlling the circulation of refrigerant through the evaporator means, the combination of, a first floating lever adapted to be operated between first and second limit positions, means responsive to a pressure indicative of evaporator temperature for moving the first floating lever to the first position when the evaporator temperature increases to a predetermined high value and to the second position when the evaporator temperature decreases to a predetermined low value, means for independently adjusting the pressure values at which the means responsive to a pressure indicative of evaporator temperature will move the first floating lever to the first and second positions, a second lever adapted to be moved between first and second limit positions, means responsive to the temperature of the medium being controlled by the evaporator means for moving the second lever to the first position when the temperatuare increases to a predetermined high value and to the second position when the temperature decreases to a predetermined low value, means for adjusting the temperature values at which the means responsive to the temperature will move the second lever to the first and second positions, a control device for controlling the mechanism which controls the circulation of refrigerant through the evaporator means, and means controlled by both levers for positioning the control device to start circulation of refrigerant through the evaporator means only when both levers are moved to the first positions and to stop circulation of refrigerant through the evaporator means when either of the levers is moved to the second position.

3. In a control system for a refrigerating apparatus having evaporator means for controlling the condition of a medium and a mechanism for controlling the circulation of refrigerant through the evaporator means, the combination of, a first floating lever adapted to be moved between first and second limit positions, means responsive to the pressure on the high pressure side of the refrigerating apparatus for moving the first floating lever to the first position when the pressure decreases to a predetermined low value and to the second position when the pressure increases to a predetermined high value, means for independently adjusting the high and low pressure values at which the means responsive to the pressure will move the first floating lever to the first and second positions, a second lever adapted to be moved between first and second limit positions, means responsive to the temperature of the medium being controlled by the evaporator means for moving the second lever to the first position when the temperature increases to a predetermined high value and to the second position when the temperature decreases to a predetermined low value, a control device for controlling the mechanism which controls the circulation of refrigerant through the evaporator means, and means controlled by both levers for positioning the control device to start circulation of refrigerant through the evaporator means only when both levers are moved to the first positions and to stop circulation of refrigerant through the evaporator means when either of the levers is moved to the second position.

4. In a control system for a refrigerating apparatus having evaporator means for controlling the condition of a medium and a mechanism for controlling the circulation of refrigerant through the evaporator means, the combination of, a first floating lever adapted to be operated between first and second limit positions, means responsive to a pressure indicative of evaporator temperature for moving the first floating lever to the first position when the evaporator temperature increases to a predetermined high value and to the second position when the evaporator temperature decreases to a predetermined low value, means for independently adjusting the pressure values at which the means responsive to a pressure indicative of evaporator temperature will move the first floating lever to the first and second positions, a second floating lever adapted to be moved between first and second limit positions, means responsive to the pressure on the high pressure side of the refrigerating apparatus for moving the second floating lever to the first position when the pressure decreases to a predetermined low value and to the second position when the pressure increases to a predetermined high value, means for independently adjusting the high and low pressure values at which the means responsive to the pressure will move the second floating lever to the first and second positions, a third lever adapted to be moved between first and second limit positions, means responsive to the temperature of the medium being controlled by the evaporator means for moving the third lever to the first position when the temperature increases to a predetermined high value and to the second position when the temperature decreases to a predetermined low value, means for adjusting the temperature values at which the means responsive to the temperature will move the third lever to the first and second positions, a control device for controlling the mechanism which controls the circulation of refrigerant through the evaporator means, and means controlled by the levers for positioning the control device to start circulation of refrigerant through the evaporator means only when the levers are moved to the first positions and to stop circulation of refrigerant through the evaporator means when any one of the levers is moved to the second position.

5. In a control system for a refrigerating apparatus having evaporator means for controlling the condition of a medium and a mechanism for controlling the circulation of refrigerant through the evaporator means, the combination of, a first control structure including a floating lever and first and second limiting stops therefor, means responsive to a pressure indicative of evaporator temperature for moving both ends of the floating lever to a first position against the first stops when the evaporator temperature increases to a predetermined high value, a pair of springs opposing the condition responsive means for moving both ends of the floating lever to a second position against the second stops when the evapvalue at which the floating lever 59 engages the lower stop 52.

A mounting structure 65 carrying a bellows 66 is mounted on the lower wall of the casing 33 and is provided with a fitting 67 to which the pipe 27 leading from the high pressure line 15 may be connected. The bellows 66 operates a plunger 68 which engages a cup 69 carried by a third floating lever 70. One end of an adjustable tension spring 71 is connected to the left end of the floating lever 70 and the other end of the spring is connected to a nut 72 screw-threadedly mounted on a screw 73 extending through the lower wall of the casing 33. In like manner one end of an adjustable tension spring 74 is connected to the other end of the floating lever 70 and the other end of the spring 74 is connected to a nut 75 screw-threadedly mounted on a screw 76 which also extends through the lower wall of the casing 33. The lever 70 also operates between the upper stops 50 and 53 and the lower stops 49 and 52. For purposes of illustration it is assumed that the spring 71 is more effective than the spring 74. When the pressure on the high pressure side of the refrigerating apparatus is 190 lbs. both ends of the floating lever 70 are engaging the upper stops 50 and 53 and when the pressure decreases from 190 lbs. to 188 lbs. the left end of the floating lever 70 engages the lower stop 49. The floating lever 70 will then remain in this position until such time as the pressure on the high pressure side decreases to 142 lbs. whereupon the right end of the floating lever 70 will move down away from the upper stop 53. When the pressure decreases to 140 lbs. the right end of the floating lever 70 will engage the lower stop 52. Here as in the previous instances the pressure values at which the left end of the floating lever 70 will engage the upper stop 50 may be adjusted independently of the pressure values at which the right end of the floating lever 70 will engage the lower stop 52 and vice versa.

Summing up the operation of the construction thus far described, the left ends of the floating levers 39, 59 and 70 will engage the upper stop 50 when the temperature within the compartment 10 decreases to 40°, the suction pressure decreases to 15 lbs. and the pressure on the high pressure side increases to 190 lbs. and the right ends of the floating levers 39, 59 and 70 will engage the lower stop 52 when the temperature within the compartment 10 increases to 42°, the suction pressure increases to 35 lbs. and the head pressure decreases to 140 lbs. respectively.

A U-shaped bracket 80 is secured to the lower wall of the casing 33 and carries a pivot pin 81 upon which is mounted a switch operating lever 82 by means of ears 83 and 84. The switch operating lever 82 carries a bracket 85 upon which is mounted a resilient contact arm 86 carrying a contact 87 which is adapted to engage a stationary contact 88 carried by a bracket 89 which is in turn supported by the U-shaped bracket 80. The switch operating lever 82 is provided with a boss 90 for holding one end of a compression spring 91. The other end of the compression spring 91 is held by a boss 92 carried by the U-shaped bracket 80. The spring 91 tends at all times to urge the switch operating lever 82 in a counter-clockwise direction about its pivot 81 as viewed in Figure 2. One of the floating levers 39, 59 and 70, for example the floating lever 59, carries a pusher 94 which is adapted to engage the right end of the switch operating lever 82. Thus when the right end of the floating lever 59 is moved from the upper stop 53 to the lower stop 52 the pusher 94 overcomes spring 91 to rotate the switch operating lever 82 about its pivot 81 in a clockwise direction. When the right end of the floating lever 59 moves from the lower stop 52 to the upper stop 53 the pusher 94 is retracted and the spring 91 is then capable of rotating the switch operating lever 82 about its pivot 81 in a counter-clockwise direction to the position shown in Figure 2.

The U-shaped bracket 80 also carries a pivot pin 96 upon which are mounted three latch members 97, 98 and 99. The latch members 97, 98 and 99 are provided with pins 100, 101 and 102, respectively, which are adapted to be engaged by the right ends of the floating levers 39, 59 and 70, respectively, when these floating levers are moved into engagement with the lower stop 52. The latch 97 is provided with a latch surface 103 which engages the resilient contact arm 86 when the latch is in the position shown in Figure 2. Gravity or spring means, not shown, normally maintain the latch member 97 in the position shown in Figure 2. The latch members 98 and 99 are also provided with latch surfaces which also engage the resilient contact arm 86. A pivot pin 105 also carried by the U-shaped bracket 80 carries a latch member 106 which is provided with an elongated pin 107 which is adapted to be engaged by the left ends of the floating levers 39, 59 and 70 when these floating levers are moved into engagement with the upper stop 50. The latch member 106 is provided with a latch surface 108 which is adapted to engage under the left end of the switch operating arm 82 when it is rotated in a clockwise direction by the pusher 94. The latch member 106 is normally urged in a counter-clockwise direction about its pivot 105 by means of gravity or spring means, not shown.

With the parts in the position shown in Figure 2, assume now that the suction pressure increases from 34 lbs. to 35 lbs. whereupon the right end of the floating lever 59 is moved away from the upper stop 53 into engagement with the lower stop 52. This movement operates the pusher 94 to rotate the switch operating lever 82 about its pivot 81 to cause the left-hand end of the switch operating lever 82 to engage the latch surface 108 of the latch 106. The switch operating lever 82 is therefore held in this clockwise position by the latch member 106. As the switch operating lever 82 is moved in a clockwise direction in this manner the resilient switch arm 86 is flexed since movement thereof is prevented by the latch members 97, 98 and 99. When the suction pressure increases to 35 lbs. so that the right end of the floating lever 59 engages the lower stop 52 the floating lever engages the pin 101 to release the latch member 98 but the contacts 87 and 89 will remain separated since they are held apart by the latch members 97 and 99. When the temperature within the compartment 10 rises to 42° to move the right end of the floating lever 39 into engagement with the lower stop 52 it also engages the pin 100 to release the latch member 97 but the contacts 87 and 88 are still held apart by the latch member 99. Similarly when the pressure on the high pressure side decreases to 140 lbs. to cause the right end of the floating lever 70 to engage the lower stop 52 the floating lever 70 engages the pin 102 to release the latch member 99. When all three of the latch members 97, 98 and 99 are released in this manner the resilient contact member 86 moves the contact 87 into engagement with the stationary contact 88 with a snap action and the compressor motor 14 and hence the compressor 13 is placed in operation. Since the switch operating lever 82 is held in the clockwise position by the latch member 106 the contacts 87 and 88 will remain engaged even though the suction pressure immediately decreases from 35 lbs. to 34 lbs. to retract the pusher 94.

Assume now that the compressor is operating and that the temperature within the compartment 10 decreases to 40°. When this occurs the left end of the floating lever 39 engages the upper stop 50 and also the pin 107 to release the latch member 106. When the latch member 106 is released the compression spring 91 rotates the switch operating lever 82 in a counter-clockwise direction to the position shown in Figure 2 to separate the contacts 87 and 89 and hence stop operation of the compressor 13. Assume now that the compressor is in operation and that the suction pressure decreases to 15 lbs. whereupon the left end of the floating lever 59 engages the upper stop 50. At this time the left end of the floating lever 59 also engages the pin 107 to release the latch member 106 whereupon the contacts 87 and 88 are separated in the manner pointed out above to stop operation of the compressor. If during operation of the compressor the pressure on the high pressure side should increase to 190 lbs. to cause the left end of the floating lever 70 to engage the upper stop 50 it will also engage the pin 107 to release the latch member 106 whereupon the contacts 87 and 88 are separated to stop operation of the compressor. After the compressor is stopped in any one of the manners pointed out above it cannot again be restarted until such time as all three of the latch members 97, 98 and 99 are released.

The operation of the control arrangement of Figures 2 and 3 may be summarized briefly as follows: The compressor 13 may be started only when all three latch members 97, 98 and 99 are released and this occurs only when the temperature increases to a predetermined high value, illustratively 42°, the suction pressure increases to a predetermined high value, illustratively 35 lbs., and the pressure on the high pressure side of the refrigerating apparatus decreases to a predetermined low value, illustratively 140 lbs. After the compressor has thus been placed in operation it can be stopped as soon as the latch member 106 is released and this may occur when either the temperature in the compartment 10 decreases to, illustratively 40°, or the suction pressure decreases to, illustratively 15 lbs., or the pressure on the high pressure side of the refrigerating apparatus increases to, illustratively 190 lbs. The floating lever construction and the independently adjustable spring means associated therewith provide a means whereby the values of the various conditions which cause starting of the refrigerating apparatus may be independently adjusted with respect to the values of the various conditions which cause stopping of the refrigerating apparatus and vice versa. For example, if it be desired to cause starting of the refrigerating apparatus when the suction pressure increases to 30 lbs. instead of 35 lbs. the adjustable spring 60 may be adjusted and this will not affect the 15 lbs. suction pressure value at which the compressor will be stopped. This independent adjustment feature is a salient feature of this invention. By reason of the above arrangement defrosting of the evaporator 11 may be accomplished during each cycle of operation when the suction pressure cut-in value is chosen above the defrosting value. Since the compressor cannot be placed in operation until such time as the pressure on the high pressure side of the refrigerating apparatus decreases to a predetermined low value the compressor is not required to start against high head pressures, the advantages of which are obvious.

The above sequences of operation are extremely beneficial when the control arrangement is utilized for controlling temperature conditions in a compartment wherein defrosting of the evaporator is desired. However, in other types of work such as controlling ice cream freezers and the like, a different sequence of operation is desirable. For example, it is desirable to start the compressor when either the suction pressure rises to a predetermined high value or the temperature in the hardening compartment rises to a predetermined high value and to stop the compressor after it has once been started only when both the suction pressure decreases to a predetermined low value and the temperature within the hardening compartment decreases to a predetermined low value. By rearranging the latch members of the construction of Figures 2 and 3 this latter sequence of operation may be readily obtained and this simple rearrangement of the latch members also is an important feature of this invention inasmuch as the same instrument may be utilized for obtaining both sequences of operation.

The manner in which the latch members may be arranged is illustrated in Figure 4. Here the pivot pin 96 in addition to carrying the latch member 99 having a pin 102 operated by the right end of the floating lever 70 carries a latch member 110 having an elongated pin 111 to be engaged by both floating levers 39 and 59. In other words, one latch member 110 operated by both floating levers 39 and 59 is substituted for the two latch members 97 and 98 of Figs. 2 and 3. Accordingly when either the temperature rises to 42° or the suction pressure rises to 35 lbs. the latch member 110 is operated to cause operation of the compressor providing the pressure on the high pressure side of the refrigerating apparatus has decreased to 140 lbs.

The pivot pin 105 carried by the U-shaped bracket 80 carries two latch members 114 and 116 instead of the single latch member 106 as shown in Figures 2 and 3. The latch member 114 carries a pin 115 which may be engaged by both the floating lever 59 and the floating lever 70. The latch member 116 carries a pin 117 adapted to be engaged by the left end of floating lever 39 and may also be provided with an extension 118 carrying a pin 119 to be engaged by the left end of the floating lever 70.

Assume now that the compressor is in operation and that the suction pressure decreases to 15 lbs. whereupon the floating lever 59 engages the pin 115. The latch member 114 will be released but the switch will remain closed inasmuch as it is held in the closed position by the latch member 116. If on the other hand the temperature should decrease to 40° the left-hand end of the floating lever 39 engages the pin 117 to release the latch member 116 but the switch will remain closed since the latch member 114 is holding the switch closed. Accordingly the switch orator temperature decreases to a predetermined low value, said springs being so arranged that one end of the lever engages the first stops before the other end, and the other end of the floating lever engages the second stops before the first end, means for independently adjusting each spring for independently adjusting the pressure values at which the means responsive to a pressure indicative of evaporator temperature will move both ends of the floating lever into engagement with the first stops and will move both ends of the floating lever into engagement with the second stops, a second control structure including a floating lever and first and second limiting stops therefor, means responsive to the pressure on the high pressure side of the refrigerating apparatus for moving both ends of the floating lever to a second position against the second stops when the pressure increases to a predetermined high value, a pair of springs opposing the pressure responsive means for moving both ends of the floating lever to a first position against the first stops when the pressure decreases to a predetermined low value, said springs being so arranged that one end of the floating lever engages the first stops before the other end and the other end of the floating lever engages the second stops before the first end and means for independently adjusting each spring for independently adjusting the pressure values at which the pressure responsive means will cause both ends of the floating lever to engage the first stops and at which pressure both ends of the floating lever will engage the second stops, a control device for controlling the mechanism which controls the circulation of refrigerant through the evaporator means, and means controlled by the levers of the first and second control structures for positioning the control device to start circulation of refrigerant through the evaporator means only when both ends of both levers are moved to the first positions to engage the first stops and to stop circulation of refrigerant through the evaporator means when both ends of either lever are moved to the second positions to engage the second stops.

6. In a control system for a refrigerating apparatus having evaporator means for controlling the condition of a medium and a mechanism for controlling the circulation of refrigerant through the evaporator means, the combination of, a first control structure including a floating lever and first and second limiting stops therefor, means responsive to a pressure indicative of evaporator temperature for moving both ends of the floating lever to a first position against the first stops when the evaporator temperature increases to a predetermined high value, a pair of springs opposing the condition responsive means for moving both ends of the floating lever to a second position against the second stops when the evaporator temperature decreases to a predetermined low value, said springs being so arranged that one end of the floating lever engages the first stops before the other end, and the other end of the floating lever engages the second stops before the first end, means for independently adjusting each spring for independently adjusting the pressure values at which the means responsive to a pressure indicative of evaporator temperature will move both ends of the floating lever into engagement with the first stops and will move both ends of the floating lever into engagement with the second stops, a second control structure including a lever movable between first and second limit positions, means responsive to the condition of the medium being controlled by the evaporator means for moving the lever to the first position when the condition increases to a predetermined high value and adjustable spring means opposing the condition responsive means for moving the lever to the second position when the condition decreases to a predetermined low value, a control device controlling the mechanism which controls the circulation of refrigerant through the evaporator means, and means controlled by the levers of the first and second control structures for positioning the control device to start circulation of refrigerant through the evaporator means only when the levers of both control structures are moved to the first positions and to stop circulation of refrigerant through the evaporator means when the lever of either control structure is moved to the second position.

7. In a control system for a refrigerating apparatus having evaporator means for controlling the condition of a medium and a mechanism for controlling the circulation of refrigerant through the evaporator means, the combination of, a first control structure including a floating lever and first and second limiting stops therefor, means responsive to the pressure on the high pressure side of the refrigerating apparatus for moving both ends of the floating lever to a second position against the second stops when the pressure increases to a predetermined high value, a pair of springs opposing the pressure responsive means for moving both ends of the floating lever to a first position against the first stops when the pressure decreases to a predetermined low value, said springs being so arranged that one end of the floating lever engages the first stops before the other end, and the other end of the floating lever engages the second stops before the first end, means for independently adjusting each spring for independently adjusting the pressure values at which said pressure responsive means will move both ends of the floating lever into engagement with the first stops and at which both ends of the floating lever will engage the second stops, a second control structure including a lever movable between first and second limit positions, means responsive to the condition of the medium being controlled by the evaporator means for moving the lever to the first position when the condition increases to a predetermined high value and adjustable spring means opposing the condition responsive means for moving the lever to the second position when the condition decreases to a predetermined low value, a control device controlling the mechanism which controls the circulation of refrigerant through the evaporator means, and means controlled by the levers of the first and second control structures for positioning the control device to start circulation of refrigerant through the evaporator means only when the levers of both control structures are moved to the first positions and to stop circulation of refrigerant through the evaporator means when the lever of either control structure is moved to the second position.

8. In a control system for a refrigerating apparatus having evaporator means for controlling the condition of a medium and a mechanism for controlling the circulation of refrigerant through the evaporator means, the combination of, a first control structure including a floating lever and first and second limiting stops therefor, means responsive to a pressure indicative of evaporator temperature for moving both ends of the floating lever to a first position against the first stops when the evaporator temperature increases to a predetermined high value, a pair of springs opposing the pressure responsive means for moving both ends of the floating lever to a second position against the second stops when the evaporator temperature decreases to a predetermined low value, said springs being so arranged that one end of the floating lever engages the first stops before the other end, and the other end of the floating lever engages the second stops before the first end, and means for independently adjusting each spring for independently adjusting the pressure values at which the means responsive to a pressure indicative of evaporator temperature will move both ends of the floating lever into engagement with the first stops and at which both ends of the floating lever will engage the second stops, a second control structure including a floating lever and first and second limiting stops therefor, means responsive to the pressure on the high pressure side of the refrigerating apparatus for moving both ends of the floating lever to a second position against the second stops when the pressure increases to a predetermined high value, a pair of springs opposing the pressure responsive means for moving both ends of the floating lever to a first position against the first stops when the pressure decreases to a predetermined low value, said springs being so arranged that one end of the floating lever engages the first stops before the other end, and the other end of the floating lever engages the second stops before the first end, means for independently adjusting each spring for independently adjusting the pressure values at which both ends of the floating lever engage the first stops and at which both ends of the floating lever engage the second stops, a third control structure including a lever movable between first and second limit positions, means responsive to the condition of the medium being controlled by the evaporator means for moving the lever to the first position when the condition increases to a predetermined high value and adjustable spring means opposing the condition responsive means for moving the lever to the second position when the condition decreases to a predetermined low value, a control device controlling the mechanism which controls the circulation of refrigerant through the evaporator means, and means controlled by the levers of the first, second, and third control structures for positioning the control device to start circulation of refrigerant through the evaporator means only when the levers of all of the control structures are moved to the first positions and to stop circulation of refrigerant through the evaporator means when the lever of any control structure is moved to the second position.

9. In a control arrangement, the combination of, a first control structure including a floating lever and first and second limiting stops therefor, first condition responsive means for moving both ends of the floating lever to a first limit position against the first stops, a pair of springs opposing the first condition responsive means for moving both ends of the floating lever to a second limit position against the second stops, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a second control structure including a lever movable between first and second limit positions, second condition responsive means for moving the lever to the first limit position, adjustable spring means opposing the second condition responsive means for moving the lever to the second limit position, a control device movable between two positions for performing a control function, and means controlled by both levers upon movement thereof to the limit positions for positioning the control device.

10. In a control arrangement, the combination of, a first control structure including a floating lever and first and second limiting stops therefor, first condition responsive means for moving both ends of the floating lever to a first limit position against the first stops, a pair of springs opposing the first condition responsive means for moving both ends of the floating lever to a second limit position against the second stops, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a second control structure including a lever movable between first and second limit positions, second condition responsive means for moving the lever to the first limit position, adjustable spring means opposing the second condition responsive means for moving the lever to the second limit position, a control device movable between two control positions for performing a control function, and means controlled by the levers of both control structures for moving the control device to one control position only when the levers of both control structures are moved to one of the limit positions and for moving the control device to the other control position when the lever of either control structure is moved to the other limit position.

11. In a control arrangement, the combination of, a plurality of control structures, each including a floating lever and first and second stops therefor, condition responsive means for moving both ends of the floating lever to a first limit position against the first stops, a pair of springs opposing the condition responsive means for moving both ends of the floating lever to a second limit position against the second stops, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a control device movable between two positions for performing a control function, and means controlled by the floating levers of all of the control structure upon movement thereof to the limit positions for positioning the control device.

12. In a control arrangement, the combination of, a plurality of control structures, each including a floating lever and first and second stops therefor, condition responsive means for moving both ends of the floating lever to a first limit position against the first stops, a pair of springs opposing the condition responsive means for moving both ends of the floating lever to a second limit position against the second stops, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a control device movable between two control positions for performing a control function, and means controlled by the floating levers of all of the control structures for moving the control device to one control position only when all of the floating levers are moved to one of the limit positions and for moving the control device to the other control position when any floating lever is moved to the other limit position.

13. In a control arrangement, the combination of, a first control structure including a floating lever and first and second limiting stops therefor, first condition responsive means for moving both ends of the floating lever to a first limit position against the first stops, a pair of springs opposing the first condition responsive means for moving both ends of the floating lever to a second limit position against the second stops, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a second control structure including a lever movable between first and second limit positions, second condition responsive means for moving the lever to the first limit position and adjustable spring means opposing the second condition responsive means for moving the lever to the second limit position, a switch, means for biasing the switch to a closed position, and means controlled by the levers of both control structures for allowing the biasing means to move the switch to a closed position only when the levers of both control structures are moved to one of the limit positions and for moving the switch to an open position against the action of the biasing means when the lever of either control structure is moved to the other limit position.

14. In a control arrangement, the combination of, a plurality of control structures, each including a floating lever and first and second stops therefor, condition responsive means for moving both ends of the floating lever to a first limit position against the first stops, a pair of springs opposing the condition responsive means for moving both ends of the floating lever to a second limit position against the second stops, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a switch, means for biasing the switch to a closed position, and means controlled by the floating levers of all of the control structures for allowing the biasing means to move the switch to a closed position only when all of the floating levers are moved to one of the limit positions and for moving the switch to an open position against the action of the biasing means when any floating lever is moved to the other limit position.

15. In a control arrangement, the combination of, a first control structure including a floating lever and first and second limiting stops therefor, first condition responsive means for moving both ends of the floating lever to a first limit position against the first stops, a pair of springs opposing the first condition responsive means for moving both ends of the floating lever to a second limit position against the second stops, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a second control structure including a lever movable between first and second limit positions, second condition responsive means for moving the lever to the first limit position and adjustable spring means opposing the second condition responsive means for moving the lever to the second limit position, a switch, latch means for controlling the opening and closing movements of the switch, and means controlled by the levers of both control structures for releasing the latch means when the levers are moved to their limit positions.

16. In a control arrangement, the combination of, a plurality of control structures, each including a floating lever and first and second stops therefor, condition responsive means for moving both ends of the floating lever to a first limit position against the first stops, a pair of springs opposing the condition responsive means for moving both ends of the floating lever to a second limit position against the second stops, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a switch, latch means for controlling the opening and closing movements of the switch, and means controlled by the floating levers of all of the control structures for releasing the latch means when the floating levers are moved to their limit positions.

17. In a control system for a refrigeration apparatus having evaporator means for controlling the condition of a medium and a mechanism for controlling the circulation of refrigerant through the evaporator means, the combination of, a first control structure including a lever movable between first and second limit positions and means responsive to the condition of the medium being controlled by the evaporator means for moving the lever to the first limit position when the condition increases to a predetermined high value and for moving the lever to the second limit position when the condition decreases to a predetermined low value, a second control structure including a lever movable between first and second limit positions and means responsive to a condition indicative of evaporator temperature for moving the lever to the first limit position when the evaporator temperature increases to a predetermined high value and for moving the lever to the second limit position when the evaporator temperature decreases to a predetermined low value, a control device for controlling the mechanism which controls the circulation of refrigerant through the evaporator means, and means controlled by both levers for positioning the control device either to start circulation of refrigerant through the evaporator means only when both levers are moved to the first positions or to start circulation of refrigerant through the evaporator means when either of the levers is moved to the first position.

18. In a control system for a refrigerating apparatus having evaporator means for controlling the condition of a medium and a mechanism for controlling the circulation of refrigerant through the evaporator means, the combination of, a first control structure including a lever movable between first and second limit positions and means responsive to the condition of the medium being controlled by the evaporator means for moving the lever to the first limit position when the condition increases to a predetermined high value and for moving the lever to the second limit position when the condition decreases to a predetermined low value, a second control structure including a lever movable between first and second limit positions and means responsive to a condition indicative of evaporator temperature for moving the lever to the first limit position when the evaporator temperature increases to a predetermined high value and for moving the lever to the second limit position when the evaporator temperature decreases to a predetermined low value, a control device for controlling the mechanism which controls the circulation of refrigerant through the evaporator means, and means controlled by both levers for positioning the control device either to start circulation of refrigerant through the evaporator means only when both levers are moved to the first positions and to stop circulation of refrigerant through the evaporator means when either of the levers is moved to the second position or to start circulation of refrigerant through the evaporator means when either of the levers is moved to the first position and to stop circulation of refrigerant through the evaporator means only when both levers are moved to the second positions.

19. In a control system for a refrigerating apparatus having evaporator means for controlling the condition of a medium and a mechanism for controlling the circulation of refrigerant through the evaporator means, the combination of, a first floating lever adapted to be operated between first and second limit positions, means responsive to a condition indicative of evaporator temperature for moving the first floating lever to the first position when the evaporator temperature increases to a predetermined high value and to the second position when the evaporator temperature decreases to a predetermined low value, means for independently adjusting the control point at which the first floating lever is moved to the first and second positions, a second lever adapted to be moved between first and second limit positions, means responsive to the condition of the medium being controlled by the evaporator means for moving the second lever to the first position when the condition increases to a predetermined high value and to the second position when the condition decreases to a predetermined low value, means for adjusting the control point for the condition being controlled by the evaporator means at which the second lever is moved to the first and second positions, a control device for controlling the mechanism which controls the circulation of refrigerant through the evaporator means, and means controlled by both levers upon movement thereof to their limit positions for positioning the control device to control the circulation of refrigerant through the evaporator means.

20. In a control system for a refrigerating apparatus having evaporator means for controlling the condition of a medium and a mechanism for controlling the circulation of refrigerant through the evaporator means, the combination of, a first floating lever adapted to be operated between first and second limit positions, means responsive to a condition indicative of evaporator temperature for moving the first floating lever to the first position when the evaporator temperature increases to a predetermined high value and to the second position when the evaporator temperature decreases to a predetermined low value, means for independently adjusting the control point at which the first floating lever is moved to the first and second positions, a second lever adapted to be moved between first and second limit positions, means responsive to the condition of the medium being controlled by the evaporator means for moving the second lever to the first position when the condition increases to a predetermined high value and to the second position when the condition decreases to a predetermined low value, means for adjusting the control point for the condition being controlled by the evaporator means at which the second lever is moved to the first and second positions, a control device for controlling the mechanism which controls the circulation of refrigerant through the evaporator means, and means controlled by both levers for positioning the control device to start circulation of refrigerant through the evaporator means when either lever is moved to the first limit position and to stop circulation of refrigerant through the evaporator means only when both levers are moved to the second positions.

21. In a control system for a refrigerating apparatus having evaporator means for controlling the condition of a medium and a mechanism for controlling the circulation of refrigerant through the evaporator means, the combination of, a first control structure including a floating lever and first and second limiting stops therefor, means responsive to a condition indicative of evaporator temperature for moving both ends of the floating lever to a first position against the first stops when the evaporator temperature increases to a predetermined high value, a pair of springs opposing the condition responsive means for moving both ends of the floating lever to a second position against the second stops when the evaporator temperature decreases to a predetermined low value, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a second control structure including a lever movable between first and second limit positions, means responsive to the condition of the medium being controlled by the evaporator means for moving the lever to the first position when the condition increases to a predetermined high value and adjustable spring means opposing the condition responsive means for moving the lever to the second position when the condition decreases to a predetermined low value, a control device controlling the mechanism which controls the circulation of refrigerant through the evaporator means, and means controlled by the levers of the first and second control structures upon movement thereof to their limit positions for positioning the control device to control the circulation of refrigerant through the evaporator means.

22. In a control system for a refrigerating apparatus having evaporator means for controlling the condition of a medium and a mechanism for controlling the circulation of refrigerant through the evaporator means, the combination of, a first control structure including a floating lever and first and second limiting stops therefor, means responsive to a condition indicative of evaporator temperature for moving both ends of the floating lever to a first position against the first stops when the evaporator temperature increases to a predetermined high value, a pair of springs opposing the condition responsive means for moving both ends of the floating lever to a second position against the second stops when the evaporator temperature decreases to a predetermined low value, said springs being so arranged that one end of the floating lever engages the first stops before the other end, and the other end of the floating lever engages the second stops before the first end, means for independently adjusting each spring for independently adjusting the control point at which both ends of the floating lever engage the first stops and at which both ends of the floating lever engage the second stops, a second control structure including a lever movable between first and second limit positions, means responsive to the condition of the medium being controlled by the evaporator means for moving the lever to the first position when the condition increases to a predetermined high value and adjustable spring means opposing the condition responsive means for moving the lever to the second position when the condition decreases to a predetermined low value, a control device controlling the mechanism which controls the circulation of refrigerant through the evaporator means, and means controlled by the levers of the first and second control structures for positioning the control device to start circulation of refrigerant through the evaporator means when either of the levers is moved to the first position and to stop circulation of refrigerant through the evaporator means only when both levers are moved to the second positions.

CHARLES B. SPANGENBERG.